US 9,862,295 B2

(12) United States Patent
Fujita et al.

(10) Patent No.: US 9,862,295 B2
(45) Date of Patent: Jan. 9, 2018

(54) SEAT SUSPENSION

(71) Applicant: DELTA TOOLING CO., LTD., Hiroshima-shi (JP)

(72) Inventors: Etsunori Fujita, Higashihiroshima (JP); Hiroki Oshimo, Higashihiroshima (JP)

(73) Assignee: DELTA TOOLING CO., LTD., Hiroshima-shi (JP)

( * ) Notice: Subject to any disclaimer, the term of this patent is extended or adjusted under 35 U.S.C. 154(b) by 0 days.

(21) Appl. No.: 14/786,900

(22) PCT Filed: Apr. 22, 2014

(86) PCT No.: PCT/JP2014/061339
§ 371 (c)(1),
(2) Date: Oct. 23, 2015

(87) PCT Pub. No.: WO2014/175290
PCT Pub. Date: Oct. 30, 2014

(65) Prior Publication Data
US 2016/0068087 A1 Mar. 10, 2016

(30) Foreign Application Priority Data
Apr. 25, 2013 (JP) ................ 2013-093120

(51) Int. Cl.
*F16M 13/00* (2006.01)
*B60N 2/50* (2006.01)
*B60N 2/54* (2006.01)

(52) U.S. Cl.
CPC ............. *B60N 2/502* (2013.01); *B60N 2/506* (2013.01); *B60N 2/544* (2013.01)

(58) Field of Classification Search
CPC ......... B60N 2/502; B60N 2/544; B60N 2/506
(Continued)

(56) References Cited

U.S. PATENT DOCUMENTS 3,908,953 A * 9/1975 Miller .................... B60N 2/506
248/421
3,917,209 A * 11/1975 Adams .................. B60N 2/502
248/421
(Continued)

FOREIGN PATENT DOCUMENTS

EP 1030076 A1 * 8/2000 ............. B60N 2/502
JP 64-2630 U 1/1989
(Continued)

OTHER PUBLICATIONS

International Search Report dated Jun. 24, 2014 for PCT/JP2014/061339 filed on Apr. 22, 2014.

*Primary Examiner* — Kimberly Wood
(74) *Attorney, Agent, or Firm* — Oblon, McClelland, Maier & Neustadt, L.L.P.

(57) ABSTRACT

A seat support suspension improving an absorption characteristic of low-cycle vibrations resulting from rolling. A seat support member supporting a seat is provided via a rolling absorption mechanism for absorbing rolling on brackets as a vehicle body side attachment member attached to the vehicle body side. Thus, rolling, low-cycle vibrations, generated by a phase shift or the like of a hydraulic suspension of the vehicle can be absorbed by the rolling absorption mechanism, a lateral displacement of the body of the seated person can be prevented, stability of a seated posture can be increased, and moreover occurrence of motion sickness can be suppressed.

6 Claims, 7 Drawing Sheets

(58) Field of Classification Search
USPC .......................................... 248/157, 421, 419
See application file for complete search history.

(56) References Cited

U.S. PATENT DOCUMENTS

| | | | | |
|---|---|---|---|---|
| 4,151,973 | A * | 5/1979 | Sedlock ................. | B60N 2/502 |
| | | | | 248/421 |
| 4,241,894 | A * | 12/1980 | Okuyama .............. | B60N 2/505 |
| | | | | 248/576 |
| 6,267,344 | B1 * | 7/2001 | Tateyama ............... | B60N 2/502 |
| | | | | 248/157 |
| 2005/0242264 | A1 * | 11/2005 | John ...................... | B60N 2/502 |
| | | | | 248/424 |
| 2015/0300785 | A1 * | 10/2015 | Lamparter .............. | F41H 7/046 |
| | | | | 297/216.17 |
| 2016/0082870 | A1 * | 3/2016 | Fujita .................... | B60N 2/501 |
| | | | | 248/561 |

FOREIGN PATENT DOCUMENTS

| | | |
|---|---|---|
| JP | 2-13834 U | 1/1990 |
| JP | 3-88850 U | 9/1991 |
| JP | 2003-320884 A | 11/2003 |
| JP | 2005-199939 A | 7/2005 |
| JP | 2010-179719 A | 8/2010 |

\* cited by examiner

SEAT SUSPENSION

TECHNICAL FIELD

The present invention relates to a seat suspension supporting a seat for a vehicle such as an automobile.

BACKGROUND ART

In Patent Documents 1, 2, a seat suspension as follows is disclosed. Specifically, an upper frame provided to be vertically movable with respect to a lower frame attached to a vehicle body floor is supported elastically with a magnetic spring and a torsion bar. Utilizing that the magnetic spring has a negative spring constant in a predetermined displacement range, by combining with the torsion bar having a positive spring constant, a spring constant resulted from superposing both the springs in the predetermined displacement range becomes substantially zero, making a structure such that even when a friction force of a link or the like is included therein, the spring constant (stationary spring constant) of the entire seat suspension (entire system) is kept in the vicinity of the above-described substantially zero, so as to absorb vibrations. Further, Patent Document 3 has proposed a technology to elastically support a fixed magnet unit constituting the magnet spring on an upper frame side or a lower frame side, so as to further improve vibration damping performance.

PRIOR ART DOCUMENT

Patent Document

Patent Document 1: Japanese Patent Application Laid-open No. 2003-320884
Patent Document 2: Japanese Patent Application Laid-open No. 2005-199939
Patent Document 3: Japanese Patent Application Laid-open No. 2010-179719

DISCLOSURE OF THE INVENTION

Problems to be Solved by the Invention

The seat suspensions disclosed in Patent Documents 1 to 3, with respect to vibrations with a predetermined frequency and amplitude, absorb vibrations by relative movements of the upper frame and the lower frame with the above-described structure using the magnetic spring and the torsion bar, but both of them respond to vertical vibrations and forward-backward vibrations inputted via the vehicle body floor from a road surface, and have no measure for low-cycle vibrations due to rolling.

Specifically, conventional measures for rolling typically are to respond by enhancing a holding property of side portions of a cushion member in a seat back part or a seat cushion part, or having a variable support pressure of the side portions of the cushion member, and taking a measure for rolling by a seat suspension is not considered. If rolling can be handled by the seat suspension, lateral shifts of the body of a seated person can be reduced without depending on the performance of the cushion member, making it easy to keep a stable posture. Further, vehicles with a long wheel base have advantages of excellent straight traveling stability and high absorbing performance of vertical and forward-backward vibrations, and hence increasingly employed these days, but in vehicles with a long wheel base and employing a hydraulically controlled suspension, a lateral phase shift increases while traveling on an irregular road surface, or the like, and low-cycle vibrations due to rolling easily occur. Such rolling impairs stability in posture as described above and further becomes a generating factor of motion sickness.

The present invention has been made in view of the above problems, and it is an object thereof to provide a seat suspension which can prevent low-cycle vibrations due to rolling, enhance stability of a seating posture and further contribute to decreasing of motion sickness.

Means for Solving the Problems

In order to solve the above-described problems, a seat suspension of the present invention is a seat suspension interposed between a vehicle body and a seat, the seat suspension including a seat support member attached to the seat side, the seat support member disposed via a rolling absorption mechanism on a vehicle body side attachment member attached to the vehicle body side.

Preferably, the rolling absorption mechanism has link mechanisms provided between the vehicle body side attachment member and the seat support member, and supporting the seat support member in a displaceable manner in a vehicle width direction relative to the vehicle body side attachment member; each of the link mechanisms includes a plurality of links, among which a link coupled to the seat support member is provided to be swayable so that a coupling point to the seat support member is displaced in an arc-shaped trace in a vehicle width direction. Preferably, a fulcrum of swaying of the links coupled to the seat support member is provided to be displaceable in a vertical direction.

Preferably, the vehicle body side attachment member has pairs of left and right brackets each having a base portion and a link support portion, the base portion being attached to the vehicle body side, the pairs of brackets being provided in positions corresponding to a front edge side and a rear edge side of the seat; the seat support member has a front edge side attachment portion with end portions in the vehicle width direction connected via the link mechanisms to the link support portions of the pair of brackets provided on the front edge side, and a rear edge side attachment portion with end portions in the vehicle width direction connected via the link mechanisms to the link support portions of the pair of brackets provided on the rear edge.

The rolling absorption mechanism can be structured to further have an elastic member elastically supporting the seat support member in the vehicle width direction with respect to the vehicle body side attachment member. In this case, preferably, the seat suspension further includes an elastic member support part provided in a middle portion in the vehicle width direction of at least one of the front edge side attachment portion and the rear edge side attachment portion of the seat support member, and a coil spring as the elastic member disposed between the elastic member support part and a portion on the vehicle body side.

Effect of the Invention

According to the present invention, a seat support member supporting a seat is provided via a rolling absorption mechanism for absorbing rolling on a vehicle body side attachment member attached to the vehicle body side. Thus, rolling (low-cycle vibrations) generated by a phase shift or the like of a hydraulic suspension of the vehicle can be absorbed by the rolling absorption mechanism, a lateral displacement of the body of the seated person can be prevented, stability of a seated posture can be increased, and moreover occurrence of motion sickness can be suppressed.

EMBODIMENT FOR CARRYING OUT THE INVENTION

Figure 1:
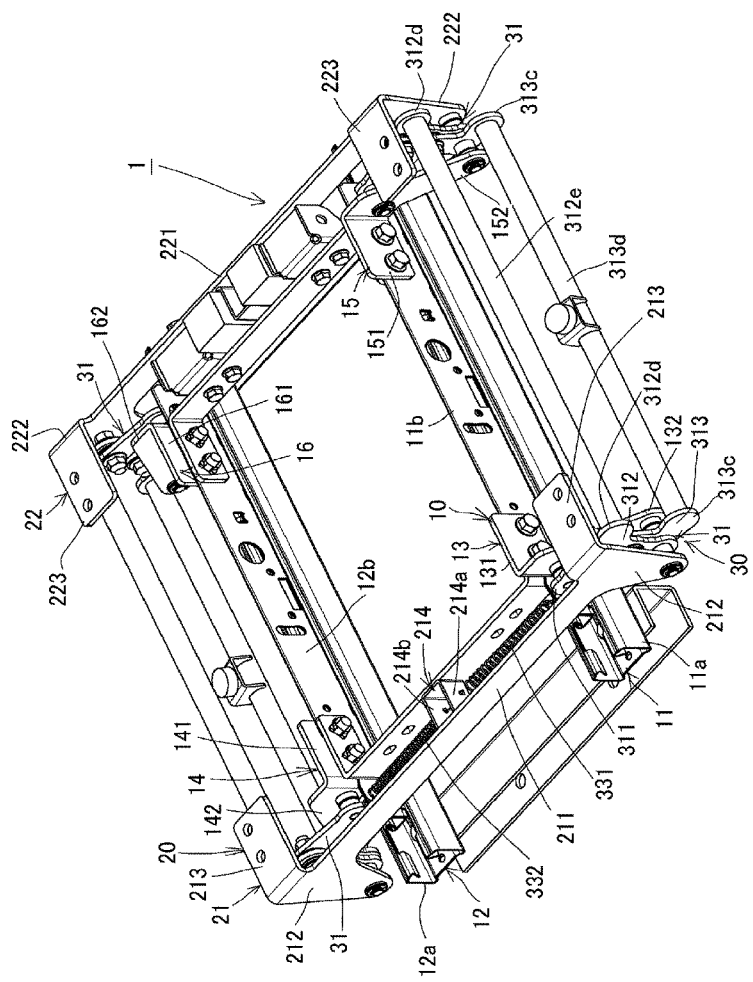
FIG. 1 is a perspective view illustrating a schematic structure of a seat suspension according to one embodiment of the present invention, the view illustrating a state that a seat support member is in a neutral position.

Hereinafter, the present invention will be explained in further detail based on embodiments illustrated in drawings. FIG. 1 is a perspective view illustrating a structure of a seat suspension 1 according to one embodiment of the present invention. The seat suspension 1 of this embodiment is structured to have a vehicle body side attachment member 10, a seat support member 20 and a rolling absorption mechanism 30.

The vehicle body side attachment member 10 has brackets 13 to 16 attached to an arbitrary member, which is a pair of sliders 11, 12 in this embodiment, on the vehicle body side. The sliders 11, 12 have lower rails 11a, 12a fixed separately at a predetermined interval on the left and right (in a vehicle-width direction) on a vehicle body floor and upper rails 11b, 12b slidably disposed on the lower rails 11a, 12a. Then, on front edge sides of the left and right upper rails 11b, 12b, front edge side brackets 13, 14 are attached, and on rear edge sides of the left and right upper rails 11b, 12b, rear edge side brackets 15, 16 are attached.

Each bracket 13 to 16 is formed in a substantially L-shape in plan view having a base portion 131 to 161 and a link support portion 132 to 162. The base portions 131 to 161 are fixed via bolts on the front edge sides and the rear edge sides of the left and right upper rails 11b, 12b. The link support portions 132 to 162 have a shape extending outward and obliquely downward from the base portions 131 to 161.

The seat support member 20 has a front edge side attachment portion 21 and a rear edge side attachment portion 22. The front edge side attachment portion 21 has a link plate portion 211, front plate portions 212 formed from both end portions of the link plate portion 211 with a reverse-L cross-sectional shape and in a substantially vertical plane state, and upper plate portions 213 bent rearward from upper edges of the front plate portions 212 and in a substantially horizontal plane state. The link plate portion 211 has a predetermined length in the vehicle-width direction and is formed to have a length so that positions of the front plate portions 212, 212 on both ends are outside the lower rails 11a, 12a of the pair of sliders 11, 12 in plan view, and the front plate portions 212, 212 are disposed at positions to substantially face the link support portions 132, 142 provided on the front edge sides.

The rear edge side attachment portion 22 likewise has a link plate portion 221, rear plate portions 222 formed from both end portions of the link plate portion 221 with a reverse-L cross-sectional shape and in a substantially vertical plane state, and upper plate portions 223 bent forward from upper edges of the rear plate portions 222 and in a substantially horizontal plane state, and is formed to have a length so that positions of the rear plate portions 222, 222 on both ends are outside the lower rails 11a, 12a of the pair of sliders 11, 12 in plan view. The rear plate portions 222, 222 are disposed at positions to substantially face the link support portions 152, 162 provided on the rear edge sides.

Further, on the upper plate portions 213, 213 located on the both end portions of the front edge side attachment portion 21 and the upper plate portions 223, 223 located on the both end portions of the rear edge side attachment portion, a cushion frame (not illustrated) constituting a seat cushion part is attached and supported.

The rolling absorption mechanism 30 is provided between the vehicle body side attachment member 10 and the seat support member 20, and prevents transmission to the seat of rolling (low-cycle vibrations) generated by a phase shift of a hydraulically controlled suspension, or the like of the vehicle. The rolling absorption mechanism 30 of this embodiment is structured to have link mechanisms 31 and elastic members 32.

There are provided four link mechanisms 31 in total which are disposed to link ones substantially facing each other between the link support portions 132 to 162 of the four brackets 13 to 16 of the vehicle body side attachment member 10, and the front plate portions 212, 212 and the rear plate portions 222, 222 of the front edge side attachment portion 21 and the rear edge side attachment portion 22 of the seat support member 20.

Figure 5:
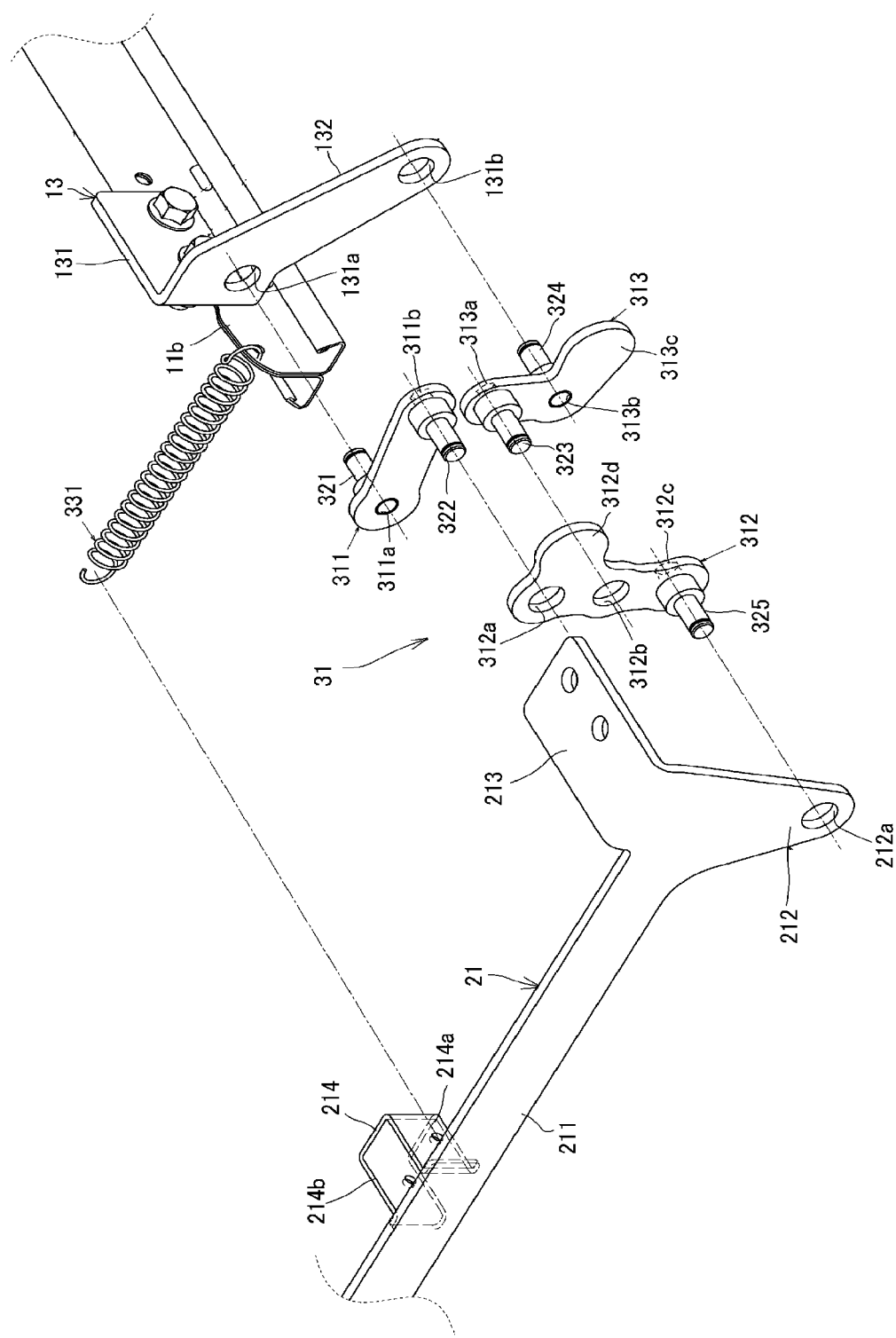
FIG. 5 is an exploded perspective view for explaining a structure of the rolling absorption mechanism in the seat suspension of the embodiment.

Each link mechanism 31 specifically has a structure illustrated in FIG. 5 and is structured to have a first link 311, a second link 312 and a third link 313. Note that in FIG. 5, one front edge side bracket 13 of the vehicle body side attachment member 10 and one front plate portion 212 of the front edge side attachment portion 21 of the seat support member 20 are exemplified, and the link mechanism 31 coupled to them is illustrated. Also, the structure of each link mechanism 31 is exactly the same, disposed between the other brackets 14 to 16 and the other front plate portion 212 of the front edge side attachment portion 21 of the seat support member 20 and the rear plate portions 222 of the rear edge side attachment portion 22.

As illustrated in FIG. 5, in the link support portion 132 of the bracket 13, an upper coupling hole 131a is formed near the base portion 131 on the upper side, and a lower coupling hole 131b is formed near a lower end located obliquely downward therefrom. On the other hand, in the front plate portion 212 of the front edge side attachment portion 21 of the seat support member 20, a lower coupling hole 212a is formed near a lower end thereof.

The first link 311 is disposed to extend in a substantially lateral direction, in which an inside through hole 311a and an outside through hole 311b are formed near respective end portions. The second link 312 is disposed to extend in a substantially vertical direction, and an upper through hole 312a, a center through hole 312b and a lower through hole 312c are formed in three positions near an upper end, a center, and a lower end. The third link 313 is formed in a substantially L shape, in which an upper through hole 313a is formed near an upper end in its substantially vertical portion, and a lower through hole 313b is formed near a lower end of the substantially vertical portion. The first link 311 is disposed to extend in the substantially lateral direction in an upper position adjacent to the front edge side bracket 13, and the third link 313 is disposed in a lower position of the first link 311. The second link 312 is disposed between the first link 311 and the third link 313 disposed thus and the front plate portion 212.

The upper coupling hole 131a of the front edge side bracket 13 and the inside through hole 311a of the first link 311 are coupled with a coupling pin 321. The outside through hole 311b of the first link 311 and the upper through hole 312a of the second link 312 are coupled with a coupling pin 322. The center through hole 312b of the second link 312 and the upper through hole 313a of the third link 313 are coupled with a coupling pin 323. The lower through hole 313b of the third link 313 and the lower coupling hole 131b of the front edge side bracket 13 are coupled with a coupling pin 324. The lower through hole 312c of the second link 312 and the lower coupling hole 212a of the front plate portion 212 are coupled with a coupling pin 325. Note that in the above explanation, for example, the inside through hole 311a and the outside through hole 311b are bored in the first link 311 to attach the coupling pins 321, 322, but the coupling pins 321, 322 may be structured to project on a surface of the first link 311 without boring the through holes. The same applies to the relation with the other links 312, 313 or in the relation between the other links 312, 313 and the bracket 13 or the front plate portion 212. In any case, they just need to be coupled so that the above-described positions of the coupling pins 321 to 325 are mutual coupling points in the relation of the links 311 to 313 with each other, in the relation between the links 311, 313 and the bracket 13, and in the relation between the link 312 and the front plate portion 212.

The second link 312 has a shape having a projecting portion 312d projecting outward adjacent to the upper through hole 312a. This projecting portion 312d projects to be located outside the link support portion 132 to 162 of each bracket 13 to 16. A reinforcement pipe 312e is bridged across the projecting portions 312d, 312d of the second links 312, 312 disposed on the front edge side and the rear edge side (see FIG. 1). This improves strength and synchronizes operations of the second links 312, 312 disposed on the front edge side and the rear edge side. Similarly, the third link 313 has a shape such that a substantially horizontal side portion has a projecting portion 313c projecting to be located outside the link support portion 132 to 162 of each bracket 13 to 16, and a reinforcement pipe 313d is bridged across the projecting portions 313c, 313c of the third links 313, 313 disposed on the front edge side and the rear edge side, improving strength and synchronizing operations of the third links 313, 313 on the front edge side and the rear edge side. Note that it is of course possible also to provide a reinforcement pipe as necessary across the first links 311, 311.

The elastic member 32 is structured to have two coil springs 331, 332. In a middle portion in the vehicle width direction of the link plate portion 211 of the front edge side attachment portion 21 in the seat support member 20, an elastic member support part 214 in a substantially U shape projecting inward is fixed by welding, one coil spring 331 is disposed between one plate portion 214a of the elastic member support part 214 and one upper rail 11b, and the other coil spring 332 is disposed between another plate portion 214b of the elastic member support part 214 and the other upper rail 12b.

Figure 2:
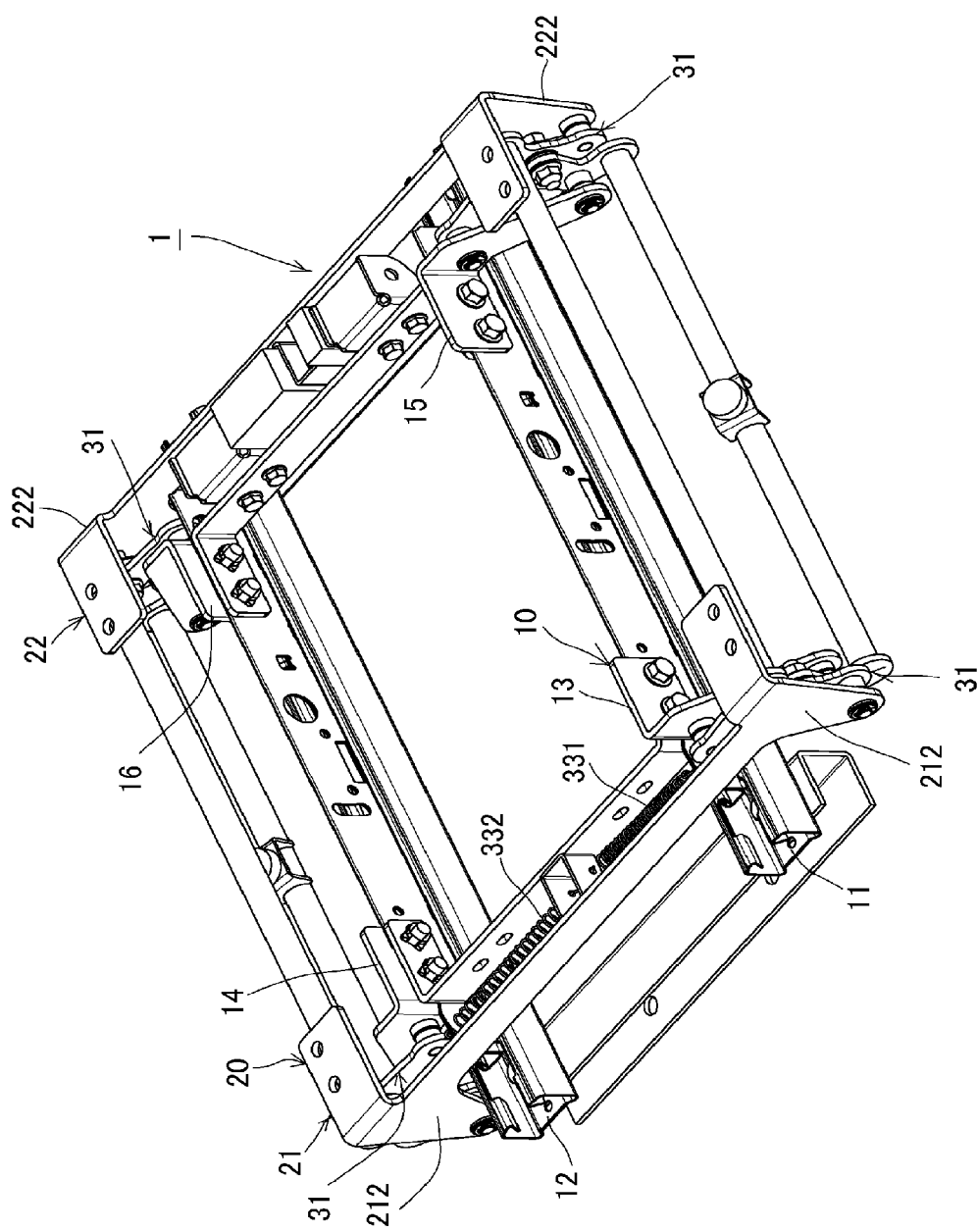
FIG. 2 is a perspective view illustrating a state that the seat support member in the seat suspension of FIG. 1 is relatively displaced to one side.

According to this embodiment, when rolling (low-cycle vibration) is generated by a phase shift or the like of the hydraulic suspension of the vehicle, the rolling absorption mechanism 30 moves the seat support member 20 in a relatively lateral direction relative to the vehicle body side attachment member 10. For example, from a neutral state of FIG. 1 and FIG. 4(a), when the vehicle body floor sways relatively leftward when seen from front as illustrated in FIG. 2 and FIG. 4(b), the seat support member 20 sways relatively rightward.

Figure 4:
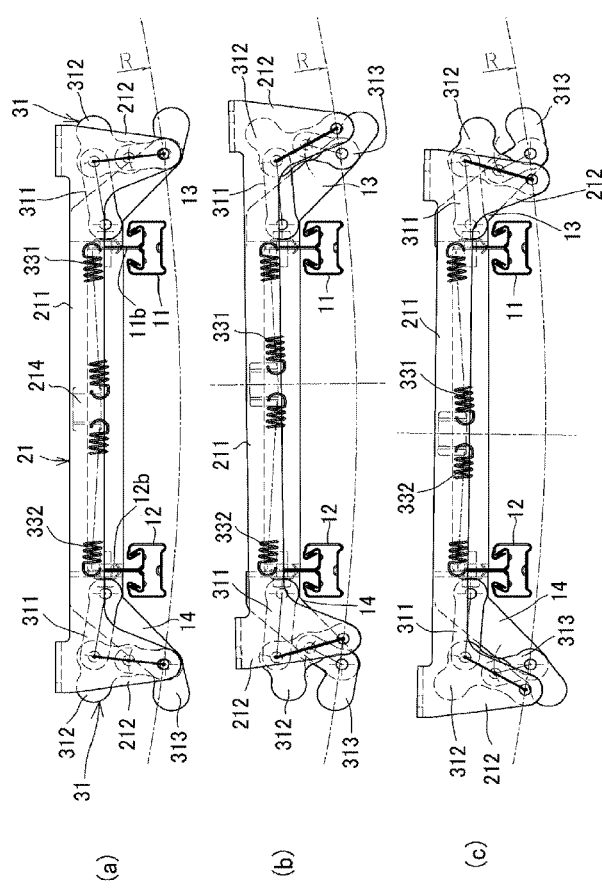
FIG. 4 are views for explaining movements of a rolling absorption mechanism in the seat suspension of the embodiment, in which (a) illustrates a state that the seat support member is in a neutral state, (b) illustrates a state that the seat support member is relatively displaced to one side, and (c) illustrates a state that the seat support member is displaced to the other side.

Here, the link mechanisms 31 move as illustrated in FIGS. 4(a) to (c) in the movement relative to the vehicle body side attachment member 10 of the seat support member 20. Note that although FIGS. 4(a) to (c) illustrate the front edge side attachment portion 21 in the seat support member 20, the movement of the rear edge side attachment portion 22 is exactly the same. That is, first, since the lower coupling holes 212a of the front plate portions 212 in the front edge side attachment portion 21 of the seat support member 20 are coupled with the coupling pins 325 to the lower through holes 312c of the second link 312, when the front edge side attachment portion 21 is displaced leftward or rightward, its coupling points (positions of the coupling pins 325) displace leftward or rightward accompanying this displacement. Since the upper through holes 312a of the second links 312 are coupled to the outside through holes 311b of the first links 311 via the coupling pins 322, the coupling points (positions of the coupling pins 325) of the lower coupling holes 212a and the lower through holes 312c displace leftward or rightward (vehicle width direction) in an arc-shaped track with the coupling pins 322 being the fulcrum of swaying.

The upper through hole 313a of the third link 313 is coupled via the coupling pin 323 to the center through hole 312b of the second link 312. Therefore, when the side of the lower through hole 312c of the second link 312 attempts to move leftward or rightward in an arc shape, in the third link 313, since its lower through hole 313b is coupled to the lower coupling hole 131b of the front edge side bracket 13 via the coupling pin 324, the side of the upper through hole 313a moves leftward or rightward in an arc shape about the coupling pin 324. Thus, with the position of the upper through hole 312a of the second link 312 being the fulcrum of swaying, the lower through hole 312c and the front edge side attachment portion 21 having the front plate portion 212 coupled to the lower through hole 312c via the coupling pin 325 move leftward or rightward in an arc shape in a stable trace. By such arc-shaped movement, the rolling is absorbed.

Figure 6:
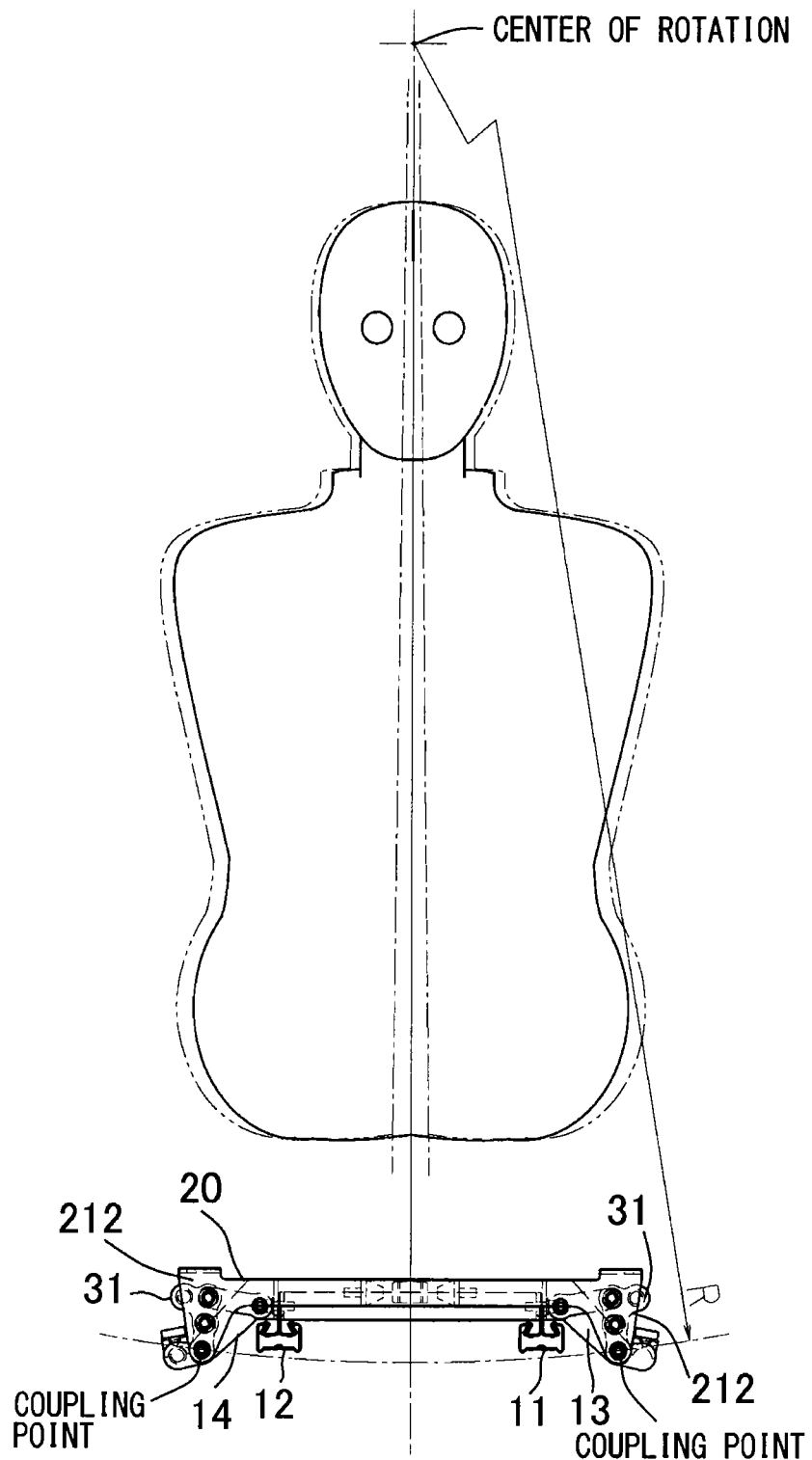
FIG. 6 is a view for explaining operations of the seat suspension of the embodiment.

On the other hand, when the coupling point (position of the coupling pin 325) of the lower through hole 312c of the second link 312 and the lower coupling hole 212a of the front plate portion 212 is allowed to make arc-shaped movement leftward or rightward so as to allow the front edge side attachment portion 21 coupled to the second link 312 (seat support member 20) to make arc-shaped movement leftward or rightward, the amount of leftward or rightward movement corresponds to the distance between the upper through hole 312a as the position of the fulcrum of swaying of the second link 312 and the lower through hole 312c at the position of the coupling point. In order to secure a necessary movement amount of the seat support member 20 with a compact member as the second link 312, that is, to increase the leftward or rightward movement amount of the front edge side attachment portion 21 (seat support member 20) by further increasing the radius of the arc-shaped movement of the lower through hole 312c at the position of the coupling point of the second link 312, in this embodiment the first link 311 is provided so that the position of the upper through hole 312a as the fulcrum of swaying of the second link 312 is able to be displaced vertically by following the leftward or rightward movement of the front edge side attachment portion 21. Specifically, the inside through hole 311a of the first link 311 is coupled to the upper coupling hole 131a of the front edge side bracket 13 via the coupling pin 321. Accordingly, the side of the outside through hole 311b coupled to the upper through hole 312a of the second link 312 makes arc-shaped movement in a vertical direction about the coupling pin 321. Thus, as illustrated in FIG. 6, a virtual center of rotation of the arc-shaped movement of the coupling point of the lower through hole 312c of the second link 312 and the lower coupling hole 212a of the front plate portion 212 can be set, for example, at a position above the head of the seated person. Note that vertical movement of the upper through hole 312a (coupling pin 322) as the fulcrum of swaying of the second link 312 can also be made by using a mechanism to displace straight in a vertical direction instead of performing it by the first link 311. However, using the first link 311 as in this embodiment has an advantage that the vertical movement can be performed with a simple structure.

As a result of that the front edge side attachment portion 21 and the rear edge side attachment portion 22 of the seat support member 20 relatively roll leftward or rightward relative to the vehicle body side attachment member 10, they are constantly located at the center point relative to rolling, and thus vibrations accompanying rolling are absorbed. Thus, a lateral displacement of the body of the seated person can be prevented, stability of a seated posture can be increased, and occurrence of motion sickness can be suppressed. Moreover, since this embodiment is structured such that the seat support member 20 sways leftward or rightward in an arc-shaped trace by the link mechanism 31, as illustrated in FIG. 6, a leftward or rightward relative displacement of the head of the seated person is smaller than a leftward or rightward relative displacement near the hip point (HP). Thus, the position of the visual line of the seated person relative to rolling is stable, visibility at a time of rolling is not impaired, and these points contribute largely to prevention of occurrence of motion sickness.

Figure 3:
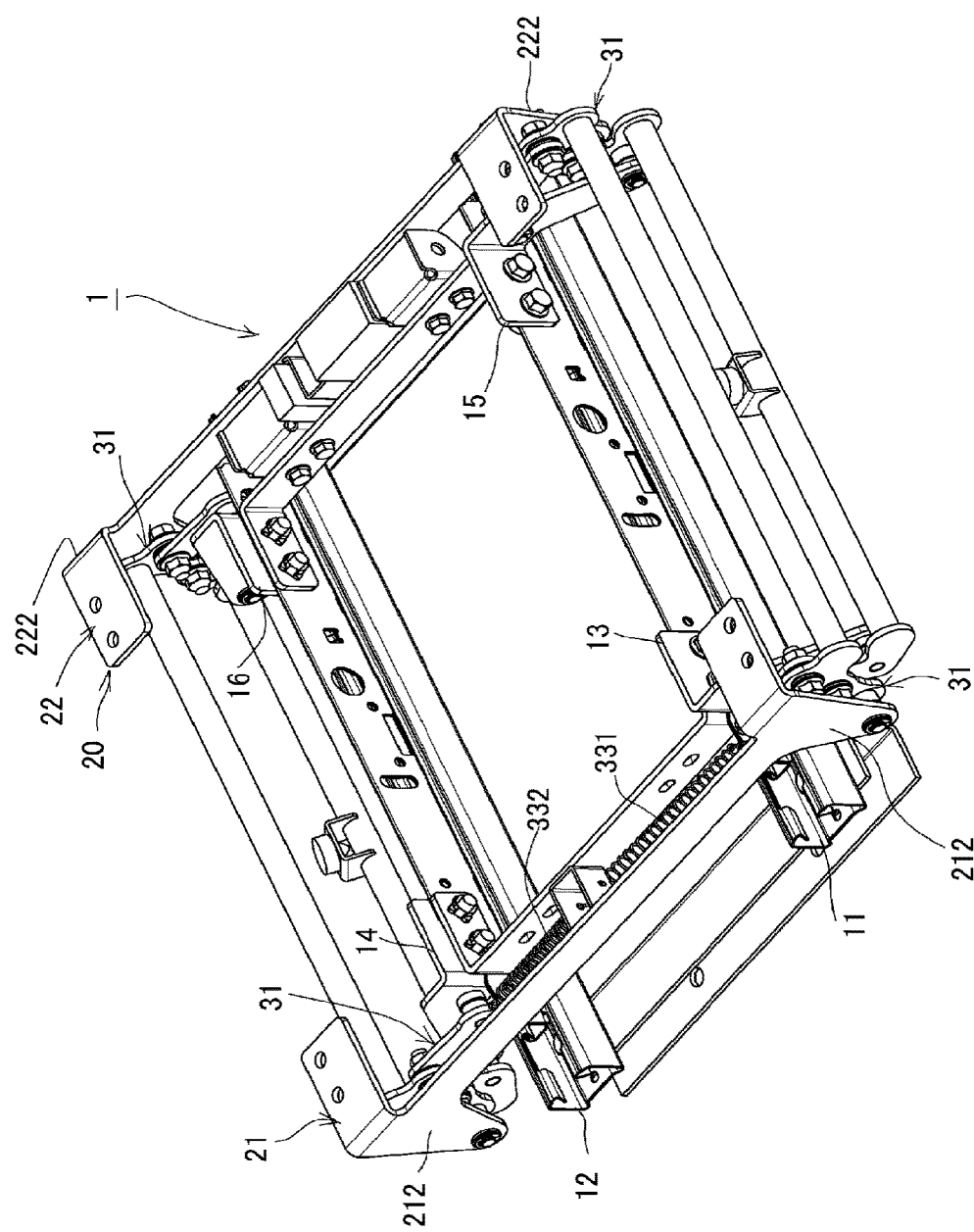
FIG. 3 is a perspective view illustrating a state that the seat support member in the seat suspension of FIG. 1 is relatively displaced to the other side.

In addition, since the rolling absorption mechanism 30 of this embodiment makes arc-shaped movement as described above, when the vehicle body floor sways relatively leftward when seen from front as illustrated in FIG. 2 and FIG. 4(b), the seat support member 20 sways relatively rightward, the coil spring 332 on the left extends, and the coil spring 331 on the right contracts. Similarly, as illustrated in FIG. 3 and FIG. 4(c), when the vehicle body floor sways in an opposite direction of the above, that is, relatively rightward when seen from front, the seat support member 20 sways relatively leftward, the coil spring 331 on the right extends, and the coil spring 332 on the left contracts. These operations restrict the range of swaying to a predetermined range, and external forces accompanying rolling in this range are buffered.

Experimental Example

Figure 7:
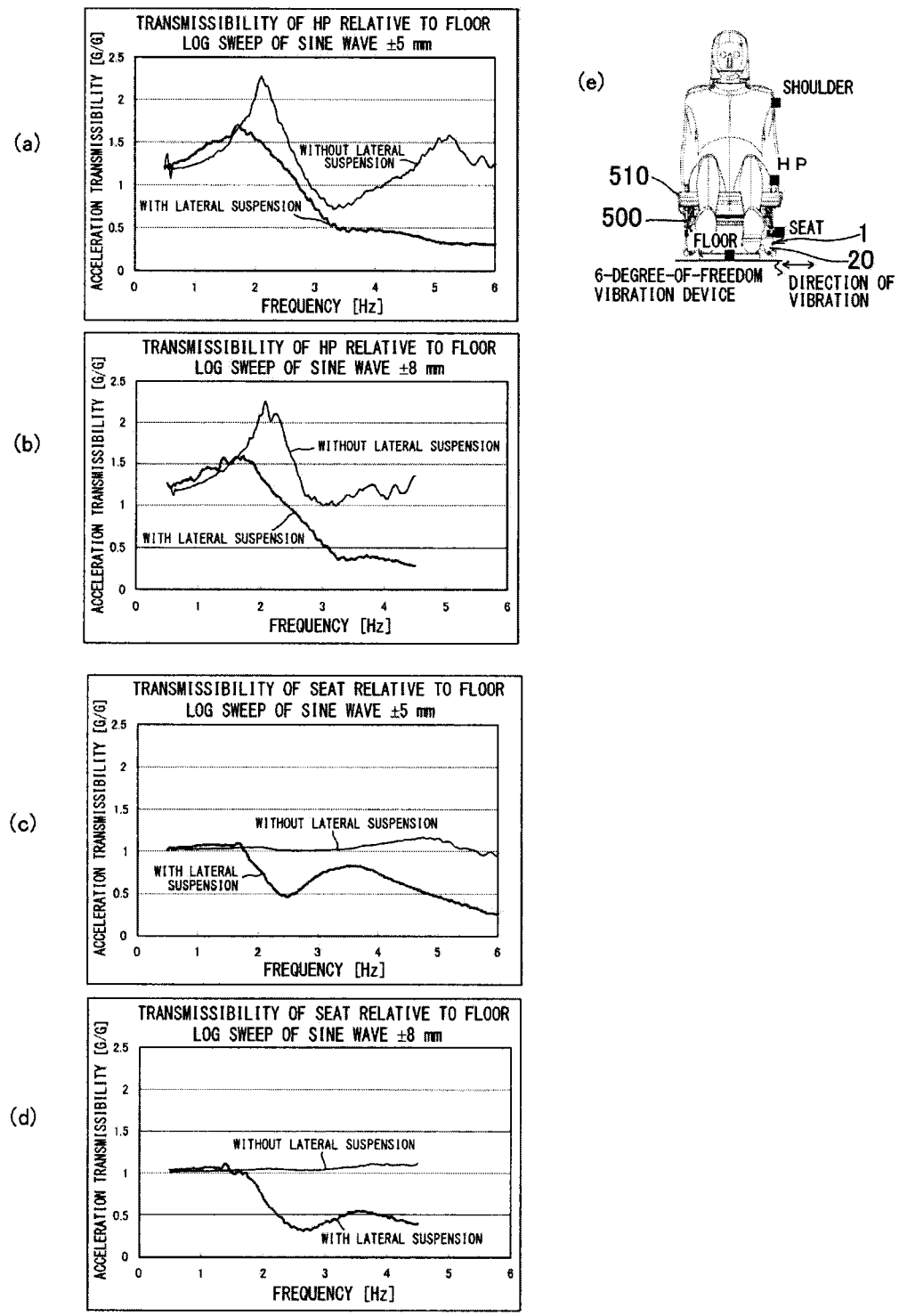
FIGS. 7(a) to (e) are diagrams for explaining measurement results of acceleration transmissibility in a lateral direction of the seat suspension of the embodiment.

As illustrated in FIG. 7(e), on the seat support member 20 of the seat suspension 1 of the embodiment set on a 6-degree-of-freedom vibration device, a cushion frame 500 was attached, a seat 510 was disposed, and a subject was seated. Acceleration pickups were attached to the vicinity of a hip bone on a side of the hip point (HP) of the subject and on a seat support member of the seat suspension 1, vibrations were generated in a lateral direction with sine waves ±5 mm, ±8 mm, and acceleration transmissibility was measured.

FIG. 7(a) illustrates acceleration transmissibility resulted from vibrations with a sine wave ±5 mm measured at HP, and FIG. 7(b) illustrates acceleration transmissibility resulted from vibrations with a sine wave ±8 mm measured at HP. In the diagrams, "with lateral suspension" indicates data when the rolling absorption mechanism 30 of the embodiment is in an operating state, and "without lateral suspension" indicates data when the rolling absorption mechanism 30 is locked to be inoperable to make it in the same state as when the rolling absorption mechanism 30 is not provided.

In either case of FIGS. 7(a), (b), there is no large difference between the cases "with lateral suspension" and "without lateral suspension" up to the vicinity of vibrating frequency of 1.5 Hz, and at vibrating frequencies in the vicinity of 1.5 Hz or higher where the seat suspension 1 of the embodiment begins to function, it can be seen that the acceleration transmissibility in the case "with lateral suspension" decreases significantly larger than in the case "without lateral suspension".

FIG. 7(c) illustrates acceleration transmissibility resulted from vibrations with a sine wave ±5 mm measured on the seat support member of the seat suspension 1, and FIG. 7(d) illustrates acceleration transmissibility resulted from vibrations with a sine wave ±8 mm measured on the seat support member of the seat suspension 1. In either case, at vibrating frequencies in the vicinity of 1.5 Hz or higher where the seat suspension 1 of the embodiment begins to function, the acceleration transmissibility in the case "with lateral suspension" decreases significantly larger than in the case "without lateral suspension".

Note that although the cushion frame is supported on the seat suspension 1 having the rolling absorption mechanism 30 in the structure in the above explanation, a structure in which not only the rolling absorption mechanism 30 but also a vertical vibration absorbing suspension mechanism is incorporated can be employed. For example, it is possible to employ a structure in which a vertical vibration absorbing suspension mechanism described in Patent Documents 1 to 3 is disposed on an upper side or lower side of the seat suspension 1 having the rolling absorption mechanism 30 of the present invention, thus having the functions of the both.

Further, in the above explanation, the brackets 13 to 16 are provided as the vehicle body side attachment member 10 on the sliders 11, 12 so as to make the seat support member 20 relatively displaceable. For example, when the vertical vibration absorbing suspension mechanism is attached to the sliders, the seat suspension 1 of the present invention is attached to this vertical vibration absorbing suspension mechanism, and thus members up to the vertical vibration absorbing suspension mechanism are the vehicle body side members.

EXPLANATION OF REFERENCE SYMBOLS 31 link mechanism
311 first link
312 second link
313 third link

The invention claimed is:

1. A seat suspension interposed between a vehicle body and a seat, the seat suspension comprising:
   a seat support member attached to a seat side, the seat support member disposed via a rolling absorption mechanism on a vehicle body side attachment member attached to a vehicle body side, wherein
   the rolling absorption mechanism has link mechanisms provided between the vehicle body side attachment member and the seat support member, and supports the seat support member in a displaceable manner in a vehicle width direction relative to the vehicle body side attachment member;
   the link mechanisms comprise a first link in which an inside coupling point is coupled to the vehicle body side attachment member to extend in a substantially lateral direction and an outside coupling point of the first link can move in an arc shape in a vertical direction about the inside coupling point, a second link in which an upper coupling point is coupled to the outside coupling point of the first link and a lower coupling point can move in an arc shape in the vehicle width direction about the upper coupling point being a fulcrum of swaying for the vehicle width direction, and a third link in which an upper coupling point of the third link is coupled to a coupling point between the upper coupling point of the second link and the lower coupling point of the second link and a lower coupling point of the third link is coupled to the vehicle body side attachment member;
   the seat support member is coupled to the lower coupling point of the second link; and
   when rolling is generated, the lower coupling point of the second link which is coupled to the seat support member is moved in the arc shape in the vehicle width direction while the upper coupling point of the second link, as the fulcrum of swaying for the vehicle width direction, is moved in the arc shape in the vertical direction.

2. The seat suspension according to claim 1, wherein:
   the vehicle body side attachment member has pairs of brackets each having a base portion and a link support portion, the base portion being attached to the vehicle body side, the pairs of brackets including a pair of brackets provided on a front edge side of the seat and a pair of bracket provided on a rear edge side of the seat; and
   the seat support member has a front edge side attachment portion with an end portion in the vehicle width direction connected via the lower coupling point of the second link coupled to the first link which is coupled to a bracket of the pair of brackets provided on the front edge side, and a rear edge side attachment portion with an end portion in the vehicle width direction connected via the lower coupling point of the second link coupled to the first link which is coupled to a bracket of the pair of brackets provided on the rear edge side.

3. The seat suspension according to claim 2, wherein the rolling absorption mechanism further has an elastic member elastically supporting the seat support member in the vehicle width direction with respect to the vehicle body side attachment member.

4. The seat suspension according to claim 3, further comprising an elastic member support part provided in a middle portion in the vehicle width direction of at least one of the front edge side attachment portion and the rear edge side attachment portion of the seat support member, and a coil spring as the elastic member disposed between the elastic member support part and a portion on the vehicle body side.

5. The seat suspension according to claim 2, further comprising a reinforcement pipe bridged across the second link disposed on the front edge side and the rear edge side.

6. The seat suspension according to claim 2, further comprising a reinforcement pipe bridged across the third link disposed on the front edge side and the rear edge side.

* * * * *